United States Patent
Chen et al.

(10) Patent No.: US 7,214,309 B2
(45) Date of Patent: *May 8, 2007

(54) PROCESS FOR UPGRADING HEAVY OIL USING A HIGHLY ACTIVE SLURRY CATALYST COMPOSITION

(75) Inventors: Kaidong Chen, Albany, CA (US); Pak C. Leung, Lafayette, CA (US); Bruce E. Reynolds, Martinez, CA (US); Julie Chabot, Novato, CA (US)

(73) Assignee: Chevron U.S.A. Inc, San Ramon, CA (US)

( * ) Notice: Subject to any disclaimer, the term of this patent is extended or adjusted under 35 U.S.C. 154(b) by 217 days.

This patent is subject to a terminal disclaimer.

(21) Appl. No.: 10/938,200

(22) Filed: Sep. 10, 2004

(65) Prior Publication Data

US 2006/0054534 A1    Mar. 16, 2006

(51) Int. Cl.
*C10G 47/02* (2006.01)
*C10G 45/04* (2006.01)

(52) U.S. Cl. .................... 208/111.3; 208/58; 208/67; 208/108; 208/111.35; 208/216 R; 208/217; 208/251 H; 208/254 H; 502/220

(58) Field of Classification Search .............. 208/58, 208/67, 108, 111.3, 111.35, 216 R, 217, 251 H, 208/254 H; 502/220
See application file for complete search history.

(56) References Cited

U.S. PATENT DOCUMENTS

| | | | |
|---|---|---|---|
| 4,710,486 A | 12/1987 | Lopez et al. | |
| 4,824,821 A * | 4/1989 | Lopez et al. ............... 502/220 |
| 4,970,190 A | 11/1990 | Lopez et al. | |
| 5,162,282 A | 11/1992 | Lopez et al. | |
| 5,164,075 A | 11/1992 | Lopez | |
| 5,178,749 A | 1/1993 | Lopez et al. | |
| 5,484,755 A | 1/1996 | Lopez | |
| 2002/0125172 A1* | 9/2002 | Que et al. ................... 208/108 |
| 2002/0166797 A1* | 11/2002 | Banerjee ..................... 208/67 |
| 2006/0054535 A1* | 3/2006 | Chen et al. ............... 208/111.3 |

* cited by examiner

*Primary Examiner*—Glenn Caldarola
*Assistant Examiner*—Prem C. Singh
(74) *Attorney, Agent, or Firm*—Penny L. Prater

(57) ABSTRACT

The instant invention is directed to a process for upgrading heavy oils using a slurry composition. The slurry composition is prepared in a series of steps, involving mixing a Group VIB metal oxide with aqueous ammonia to form an aqueous mixture and sulfiding the mixture to form a slurry. The slurry is then promoted with a Group VIII metal compound. Subsequent steps involve mixing the slurry with a hydrocarbon oil, and combining the resulting mixture with hydrogen gas (under conditions which maintain the water in a liquid phase) to produce the active slurry catalyst.

25 Claims, 2 Drawing Sheets

PROCESS FOR UPGRADING HEAVY OIL USING A HIGHLY ACTIVE SLURRY CATALYST COMPOSITION

FIELD OF THE INVENTION

The present invention relates to a process for upgrading heavy oils using a slurry composition. These oils are characterized by low hydrogen to carbon ratios and high carbon residues, asphaltenes, nitrogen, sulfur and metal contents.

BACKGROUND OF THE INVENTION

Slurry catalyst compositions and means for their preparation are known in the refining arts. Some examples are discussed below.

U.S. Pat. No. 4,710,486 discloses a process for the preparation of a dispersed Group VIB metal sulfide hydrocarbon oil hydroprocessing catalyst. Process steps include reacting aqueous ammonia and a Group VIB metal compound, such as molybdenum oxide or tungsten oxide, to form a water soluble oxygen-containing compound such as ammonium molybdate or tungstate.

U.S. Pat. No. 4,970,190 discloses a process for the preparation of a dispersed Group VIB metal sulfide catalyst for use in hydrocarbon oil hydroprocessing. This catalyst is promoted with a Group VIII metal. Process steps include dissolving a Group VIB metal compound, such as molybdenum oxide or tungsten oxide, with ammonia to form a water soluble compound such as aqueous ammonium molybdate or ammonium tungstate.

U.S. Pat. Nos. 5,164,075 and 5,484,755 (the latter patent being incorporated by reference) disclose processes for preparation of high activity slurry catalysts for hydroprocessing heavy hydrocarbon oils produced from Group VIB metal compounds. An aqueous mixture of the metal compound is sulfided with from greater than about 8 to about 14 standard cubic feet of hydrogen sulfide per pound of Group VIB metal. These patents demonstrate a process of forming a slurry catalyst precursor and adding it to a heavy feed oil to form the active catalyst. These patents do not, however, demonstrate the criticality of the oil viscosity in the formation of a highly active catalyst composition, nor the significance of maintaining water in the liquid phase in a crucial reaction step.

In the inventions disclosed in U.S. Pat. Nos. 5,164,075 and 5,484,755, the failure to form the oil and water emulsion or the slurry phase results in an inactive catalyst or a catalyst having low activity.

U.S. Pat. Nos. 5,162,282 and 5,178,749 are directed to processes for hydroprocessing of heavy hydrocarbonaceous oils. In U.S. Pat. No. 5,162,282, a catalyst precursor is prepared by reacting a Group VIB metal compound with a sulfiding agent in an aqueous environment, substantially in the absence of oil. The precursor is heated to convert it to an active catalyst, which subsequently contacts feed at hydroprocessing conditions. In U.S. Pat. No. 5,178,749, an active catalyst slurry is prepared by sulfiding an aqueous mixture of a Group VIB metal compound with hydrogen sulfide gas. The slurry is introduced, along with the oil to be treated, into a fixed or ebullating bed of hydrodesulfurization-hydrodemetalation catalyst at hydroprocessing conditions. Although both of these patents disclose hydroprocessing with catalyst formed from precursors or slurries comprising Group VIB metal compounds, neither involves the use of oils in the formation of the catalyst precursors or slurries.

This application discloses a new slurry catalyst composition that is highly active. This activity results from preparation of the catalyst using a process employing a single hydrocarbon oil (preferably a vacuum gas oil) having an appropriate viscosity range at 212° F. Product yields are primarily in the middle distillate range.

SUMMARY OF THE INVENTION

This invention is directed to a process for upgrading heavy oils which employs contacting an oil with a highly active catalyst composition. The catalyst is prepared by the following steps:

(a) mixing a Group VIB metal oxide and aqueous ammonia to form a Group VI metal compound aqueous mixture;

(b) sulfiding, in an initial reactor, the aqueous mixture of step (a) with a gas comprising hydrogen sulfide to a dosage greater than 8 SCF of hydrogen sulfide per pound of Group VIB metal to form a slurry;

(c) promoting the slurry with a Group VIII metal compound;

(d) mixing the slurry of step (c) with hydrocarbon oil having a viscosity of at least 2 cSt @ 212° F. to form Mixture X;

(e) combining Mixture X with hydrogen gas in a second reaction zone, under conditions which maintain the water in Mixture X in a liquid phase, thereby forming an active catalyst composition admixed with a liquid hydrocarbon; and (f) recovering the active catalyst composition.

This new highly active slurry catalyst composition may be stored in an active and concentrated state. The catalyst composition can be directly introduced into any of the known heavy oil or residuum upgrading processes under the existing conditions of that process. The catalyst can upgrade the very high viscosity carbonaceous and/or highly paraffinic feedstocks with or without dilution of the feedstock.

DETAILED DESCRIPTION OF THE INVENTION

This invention relates to a process for upgrading hydrocarbons using a new, highly active slurry composition. This slurry catalyst composition is formed from the combination of a slurry comprising Group VIB and Group VIII metals and a hydrocarbon oil having a viscosity of at least 2 cSt @ 212° F. The preferred viscosity range for the hydrocarbon oil is from at least about 2 cSt @ 212° F. to 15 cSt @ 212° F.

Figure 1:
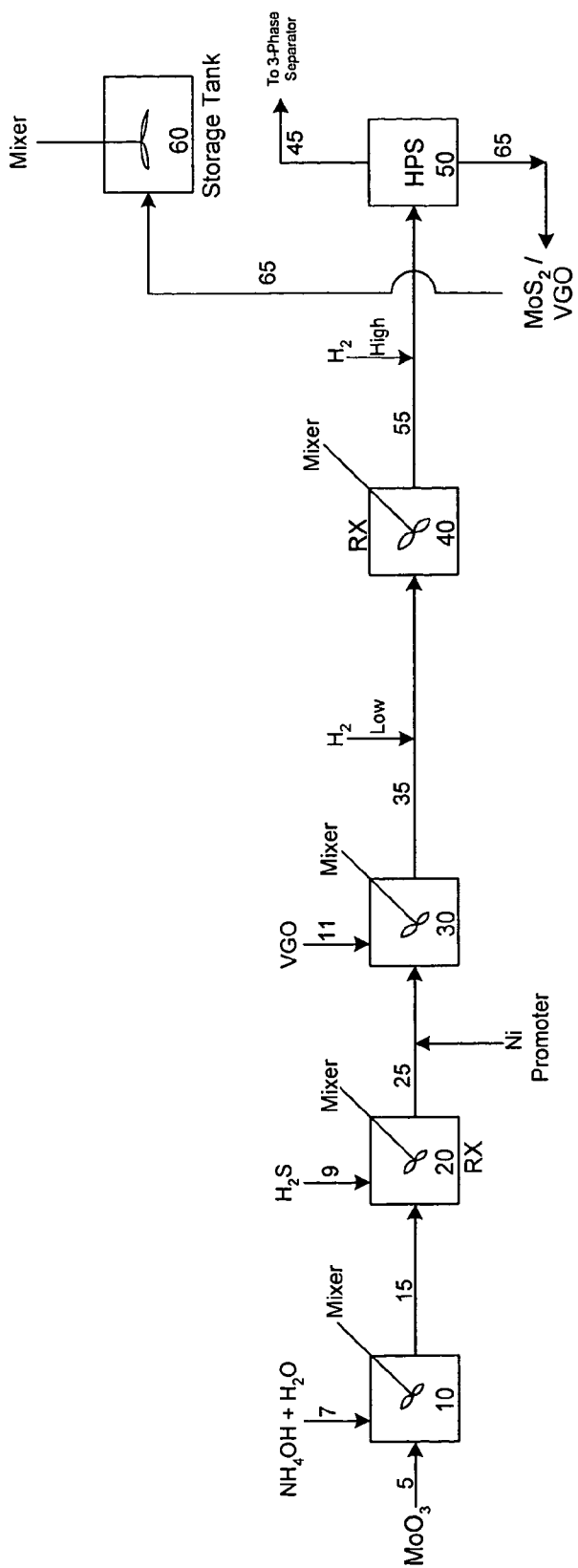
FIG. 1 illustrates the steps involved in the preparation of the catalyst composition.

FIG. 1 illustrates the steps involved in the process of this invention. The active slurry catalyst composition is prepared by mixing line 5, containing an oxide of Group VIB metal such as tungsten or molybdenum, and line 7, containing aqueous ammonia, in a mixing zone 10. The temperature of the mixing zone is generally in the range from about 80° F. to about 200° F., preferably from about 100° F. to about 150° F., and most preferably from about 110° F. to about 120° F. The pressure of the mixing zone 10 is generally from about atmospheric pressure to about 100 psig, preferably from about 5 psig to about 35 psig, and most preferably from about 10 psig to about 35 psig. The Group VIB metal oxide is dissolved in water containing the ammonia. The amount of ammonia added is based on the ratio of $NH_3$ to Group VIB oxide in lbs/lbs and generally ranges from 0.1 lbs/lbs to about 1.0 lbs/lbs, preferably from about 0.15 lbs/lbs to about 0.50 lbs/lbs, and most preferably from about 0.2 lbs/lbs to about 0.30 lbs/lbs. The dissolved metal oxide in aqueous ammonia is moved via line 15 to the first reaction zone.

The amount of hydrogen sulfide (line 9) added to the reaction zone 20 is based on the ratio of $H_2S$ to Group VI B metal oxide in SCF/lbs and generally ranges from 4.0 SCF/lbs to about 20 SCF/lbs, preferably from about 8.0 SCF/lbs to about 18 SCF/lbs, and most preferably from about 12 to 14 SCF/lbs. The reaction time in the first reaction zone ranges from about 1 hour to 10 hours, preferably from 3 hours to 8 hours, and most preferably from about 4 hours to 6 hour per pound of Group VIB metal oxide. Conditions include a temperature in the range from 80° F. to 200° F., preferably in the range from 100° F. to 180° F., and most preferably in the range from 130° F. to 160° F. Pressure is in the range from 100 to 3000 psig, preferably in the range from 200 to 1000 psig, and most preferably from 300 to 500 psig. The resultant slurry is the catalyst precursor in an aqueous slurry phase.

The resultant slurry is combined with a Group VIII metal compound such as Ni or Co, as disclosed in U.S. Pat. No. 5,484,755. As an enhancement of the denitrogenation activity of the active slurry catalyst of the present invention, it is preferred that a Group VIII metal compound be added to the slurry before mixing the slurry with feed oil and a hydrogen containing gas at elevated temperature and pressure. Such Group VIII metals are exemplified by nickel and cobalt. It is preferred that the weight ratio of nickel or cobalt to molybdenum range from about 1:100 to about 1:2. It is most preferred that the weight ratio of nickel to molybdenum range from about 1:25 to 1:10, i.e., promoter/molybdenum of 4–10 weight percent. The Group VIII metal, exemplified by nickel, is normally added in the form of the sulfate, and preferably added to the slurry after sulfiding at a pH of about 10 or below and preferably at a pH of about 8 or below. Group VIII metal nitrates, carbonates or other compounds may also be used. In view of the high activity of the slurry catalyst of the present invention, the further promotion by Group VIII metal compounds is very advantageous.

The slurry containing the Group VIII metal promoter is moved, via line 25, to mixing zone 30. Mixing zone 30 employs an inert atmosphere which can comprise nitrogen, refinery gas, or any other gas having little or no oxygen. The slurry and a hydrocarbon oil (line 11), such as VGO, are mixed continuously in a high shear mode to maintain a homogeneous slurry in mixer 30. High shear mixing encompasses a range from 100 to 1600 RPM. Preferably the mixing rate is greater than 500 RPM and most preferably greater than 1500 RPM.

The hydrocarbon oil has a kinetic viscosity of at least 2 cSt @ 212° F. The kinetic viscosity can generally range from about 2 cSt @ 212° F. to about 15 cSt @ 212° F., preferably from about 4 cSt @ 212° F. to about 10 cSt @ 212° F., and most preferably from about 5 cSt @ 212° F. to about 8 cSt @ 212° F. The hydrocarbon oil causes the initial transformation of the catalyst precursor to an oil base from a water base. The ratio of Group VIB metal oxide to oil is at least less than 1.0, preferably less than 0.5, and more preferably less than 0.1. If the kinetic viscosity of the oil is below about 2 cSt @ 212° F. or above about 15 cSt @ 212° F., the first transformation of the catalyst precursor will result in catalyst particles agglomerating or otherwise not mixing. This mixture is known in the claims as Mixture X.

The material from mixing zone 30 (Mixture X) moves to reaction zone 40 via line 35. Hydrogen is continuously added to the mixture reaction zone 40, and high shear mixing is employed in the reaction zone 40 in order to maintain a homogenous slurry. $H_2$ is added at low flow rate before reactor 40 and at high flow rate following reactor 40. The water is kept in liquid phase in reactor 40. Water is changed to vapor phase after reactor 40 in order to flash off the water in the high pressure separator. The process conditions of reactor 40 are critical to forming the final catalyst. The water in the mixture must be maintained in a liquid phase.

The temperature of the reaction zone 40 generally ranges from about 300° F. to 600° F., preferably from about 350° F. to about 500° F., and most preferably from about 350° F. to about 450° F. The pressure of the reaction zone 40 generally ranges from about 100 psig to about 3000 psig, preferably from about 200 psig to about 1000 psig, and most preferably from about 300 psig to about 500 psig. The hydrogen flow to the reaction zone 40 generally ranges from about 300 SCFB to about 2000 SCFB, preferably from about 300 SCFB to about 1000 SCFB, and most preferably from about 300 SCFB to about 500 SCFB. The reaction time in the reaction zone 40 ranges from about 10 minutes to 5 hours, preferably from 30 minutes to 3 hours, and most preferably from about 1 hour to 1.5 hours. The resultant slurry mixture is the active catalyst composition in admixture with the hydrocarbon oil.

The slurry mixture is passed, through line 55, to high pressure separator 50. More $H_2$ is added in line 55 so the water changes to vapor phase and then can be separated from oil slurry in the high pressure separator. The high pressure separator operates in a range from 300° F. to 700° F. Gases and water are removed overhead through line 45 and passed to a three phase separator. The active catalyst composition is moved through line 65 to storage tank 60. The active catalyst composition is continuously mixed in storage tank 60 to maintain a homogenous slurry in a hydrogen atmosphere with little or no oxygen. In this way, the catalyst activity and stability are maintained.

The catalyst composition is useful for upgrading carbonaceous feedstocks which include atmospheric gas oils, vacuum gas oils (VGO), deasphalted oils, olefins, oils derived from tar sands or bitumen, oils derived from coal, heavy crude oils, synthetic oils from Fischer-Tropsch processes, and oils derived from recycled oil wastes and polymers. The catalyst composition is useful for but not limited to hydrogenation upgrading processes such as thermal hydrocracking, hydrotreating, hydrodesulphurization, hydrodenitrification, and hydrodemetalization.

The process of the present invention can be operated in either one or two stage mode. In one-stage operation, the heavy oil is contacted with the active catalyst slurry and a hydrogen-containing gas at elevated temperatures and pressures in one or more continuously stirred tank reactors or ebullated bed catalytic reactors. Sufficient residence time is required in the reactors at temperatures high enough to achieve measurable thermal cracking rates.

The process may alternately be operated in two-stage mode where the first-stage comprises the contacting of the active catalyst slurry with the heavy oil and a hydrogen-containing gas for sufficient time and at appropriate temperature. Contacting occurs in continuously stirred tank reactors or ebullated bed catalytic reactors, to achieve reasonable thermal cracking rates. The resultant light oil is separated from solid catalyst and unconverted heavy oil in a high pressure separator. The light oil is sent to the second-stage reactor (which typically is a fixed bed reactor used for hydrotreating of oil) to further remove sulfur and nitrogen, and to improve product qualities.

For the first-stage operation, the temperatures for heavy oil feedstocks are normally above about 700° F., preferably above 750° F., and most preferably above 800° F. in order to achieve high conversion. The concentration of the active slurry catalyst in the heavy oil is normally from about 100 to 20,000 ppm expressed as weight of metal (molybdenum) to weight of heavy oil feedstock. Typically, higher catalyst to oil ratio will give higher conversion for sulfur, nitrogen and metal removal, as well as the higher cracking conversion. Near 100% demetalation conversion and 1000° F.+ cracking conversion of the heavy oil can be achieved at appropriate process conditions, while the coke yield can be maintained at less than about 1%.

The process conditions for the second-stage reactor (if two stages are used) are typical of heavy oil hydrotreating conditions. The second-stage reactor may be either a fixed, ebullated or a moving bed reactor. Fixed bed reactors are the most common. The catalyst used in the second-stage reactor is a hydrotreating catalyst such as those containing a Group VIB and/or a Group VI metal deposited on a refractory metal oxide. By using this integrated hydrotreating process, the sulfur and nitrogen content in the product oil can be very low, and the product oil qualities are also improved.

Figure 2:
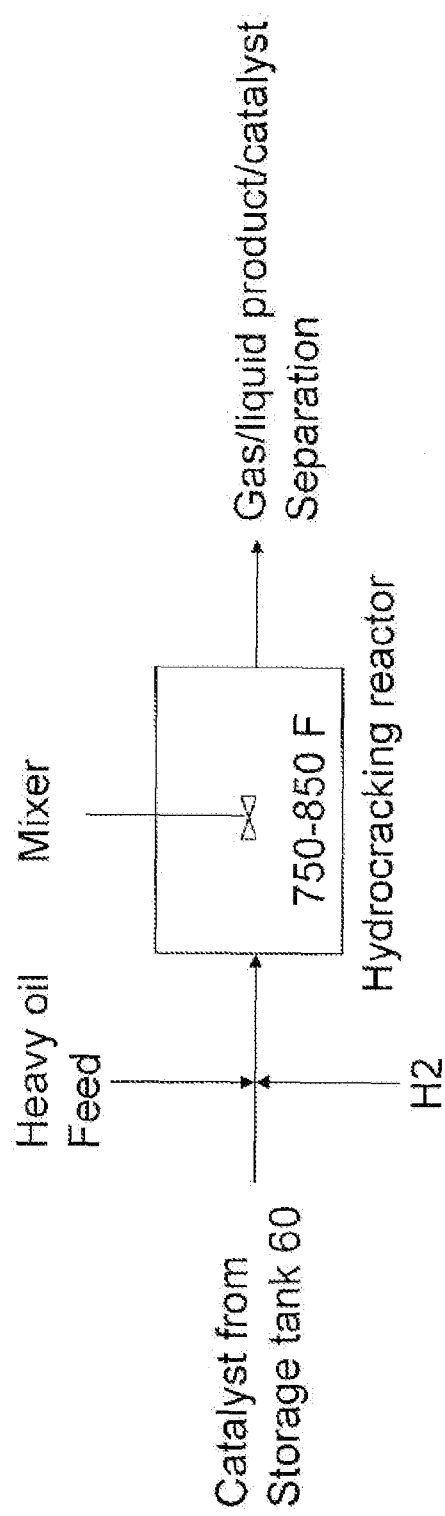
FIG. 2 illustrates the hydroconversion process of this invention. A hydrocracking process is specifically disclosed.

FIG. 2 discloses a hydrocarbon upgrading process, more specifically, hydrocracking. In FIG. 2, Catalyst from storage tank 60 in FIG. 1 (stream 10) combines with heavy oil feed (stream 20) and hydrogen (stream 30) to create stream 40. Stream 40 enters hydrocracking reactor 15 and is reacted under hydrocracking conditions. Stream 50 contains combined gas and liquid products as well as catalyst, which are subsequently separated from each other.

EXAMPLES

Example 1

Catalyst Preparation Employing a Single Oil 540 gram $MoO_3$ is mixed with 79 gram of $NH_3$ and 2381 gram of $H_2O$ to form a solution of total 3000 gram. The solution is then reacted with 10.71 SCF of $H_2S$ by passing a gas mixture of 20% $H_2S$ in $H_2$ into the solution under strong mixing. The reactor temperature is 150° F. and the total pressure is 400 psig, and the reaction time is 4 hours. After reaction, 460 gram $NiSO_4$ solution which contains 36 gram of Ni is added to the above obtained slurry. The obtained slurry mixture is then mixed with 8000 gram of vacuum gas oil at 100° F. The viscosity of the VGO is 5 cSt @ 212° F. The resulting mixture is then pumped into a continuously flow tanked reactor (perfectly mixed flow reactor) with $H_2$. The $H_2$ gas rate is 300 SCF/B. The reactor pressure is 400 psig and reactor temperature is 400° F., the total reaction time is 1 hour. The reaction products are mixed with more $H_2$ at a gas rate of 1500 SCF/B and then go to a hot high pressure separator. The separator is maintained at 400 psig pressure with a temperature of 500° F., in order to separate gas and liquid slurry. The obtained liquid slurry contains the highly active catalyst component.

Example 2

Heavy Oil Upgrading (Athabasca Vacuum Residuum in Once-Through Mode)

The catalyst slurry of Example 1 was used for Athabasca vacuum residuum and VGO feed upgrading in a process unit which contains two continuously stirred tank reactors. A feed blend with 60% Athabasca vacuum residuum (VR) and 40% Athabasca VGO was used.

The Athabasca VR feed properties are listed in the following table:

| | |
|---|---|
| API gravity at 60/60 | 3.9 |
| Sulfur (wt %) | 5.58 |
| Nitrogen (ppm) | 5770 |
| Nickel (ppm) | 93 |
| Vanadium (ppm) | 243 |
| Carbon (wt %) | 83.57 |
| Hydrogen (wt %) | 10.04 |
| MCRT. (wt %) | 17.2 |
| Viscosity @ 212° F. (cSt) | 3727 |
| Pentane Asphaltenes (wt %) | 13.9 |
| Fraction Boiling above 1050° F. (wt %) | 81 |

The Athabasca VGO feed properties are listed in the following table:

| | |
|---|---|
| API gravity at 60/60 | 15.6 |
| Sulfur (wt %) | 3.28 |
| Nitrogen (ppm) | 1177 |
| Carbon (wt %) | 85.29 |
| Hydrogen (wt %) | 11.01 |
| MCRT (wt %) | 0.04 |
| Fraction Boiling above 650° F. (wt %) | 85 |

Hydrocracking reaction conditions include a reaction temperature between about 250° C. and about 500° C. (482° F.–932° F.), pressures from about 3.5 MPa to about 24.2 MPa (500–3500 psi), and a feed rate (vol oil/vol cat h) from about 0.1 to about 20 $hr^1$. Hydrogen circulation rates are generally in the range from about 350 std liters $H_2$/kg oil to 1780 std liters $H_2$/kg oil (2,310–11,750 standard cubic feet per barrel).

The process conditions used for the heavy oil upgrading is listed as following:

| | |
|---|---|
| Total pressure (psig) | 2500 |
| Mo/Oil ratio (%) | 1.5 |
| LHSV | 0.25 |
| Reactor temperature (°F) | 810 |
| H2 gas rate (SCF/B) | 7500 |

The product yields, properties and conversion are listed in the following table:

| | |
|---|---|
| C4- gas (wt %) | 4.5 |
| C5-180° F. (wt %) | 5.0 |
| 180–350° F. (wt %) | 14.4 |
| 350–500° F. (wt %) | 20.1 |
| 500–650° F. (wt %) | 26.6 |
| 650–800° F. (wt %) | 19.6 |
| 800–1000° F. (wt %) | 7.5 |

-continued

| | |
|---|---|
| 1000° F.+ (wt %) | 0.5 |
| HDN conversion (%) | 98 |
| HDS conversion (%) | 99 |
| HDM conversion (%) | >99 |
| Liquid product API gravity | 35.2 |

Middle distillates compose 61.5 wt % of the product, and heteroatom content is drastically reduced. Metals removal (hydrodemetalation) is greater than 99%.

What is claimed is:

1. A process for the hydroconversion, wherein hydroconversion is selected from the group consisting of hydrocracking, hydrotreating, hydrodesulphurization, hydrodenitrification, and hydrodemetalization, of heavy oils the process comprising at least one reaction stage, which employs a catalyst which is prepared by the following steps:
   (a) mixing a Group VIB metal oxide and aqueous ammonia to form a Group VI metal compound aqueous mixture;
   (b) sulfiding in a single step, in an initial reaction zone (distinguished from the first reaction stage above), the aqueous mixture of step (a) with a gas comprising hydrogen sulfide to a dosage greater than 8 SCF of hydrogen sulfide per pound of Group VIB metal to form a slurry;
   (c) promoting the slurry with a Group VIII metal compound;
   (d) mixing the slurry of step (c) with hydrocarbon oil having a viscosity of at least 2 cSt @ 212° F. to form Mixture X;
   (e) combining Mixture X with hydrogen gas in a second reaction zone, under conditions which maintain the water in Mixture X in a liquid phase, thereby forming an active catalyst composition admixed with a liquid hydrocarbon; and
   (f) recovering the active catalyst composition, and combining said composition with a heavy oil feedstream and hydrogen to create a feed and catalyst mixture;
   (g) passing the feed and catalyst mixture of step (f) to a hydroconversion reaction stage having at least one reactor;
   (h) reacting the mixture of step (g) under hydroconversion conditions to create gas and liquid products;
   (i) separating the effluent of step (h) into gas products, liquid products and catalyst.

2. The process of claim 1, wherein the reactor of the first reaction stage is selected from the group consisting of one or more constant stirred tank reactors or one or more ebullating beds.

3. The process of claim 2, wherein the catalyst, a hydrogen-containing gas, and the heavy oil to be converted are combined in the first reaction stage at elevated temperature and pressure.

4. The process of claim 3, wherein residence time and reactor temperature is sufficient to achieve measurable thermal cracking rates.

5. The process of claim 1, wherein the effluent of step (h) is comprised of at least 50 wt % of products boiling in the range between 180° F. and 650° F.

6. The process of claim 1, further comprising a second reaction stage in which the second-stage reactor is selected from the group consisting of a fixed, ebullated or a moving bed reactor.

7. The process of claim 1, wherein the heavy oil is selected from the group consisting of atmospheric gas oils, vacuum gas oils (VGO), deasphalted oils, olefins, oils derived from tar sands or bitumen, oils derived from coal, heavy crude oils, synthetic oils from Fischer-Tropsch processes, and oils derived from recycled oil wastes and polymers.

8. The process of claim 1, wherein conditions in the first reaction zone for catalyst preparation comprise a temperature in the range from at least about 80° F. to about 200° F., and a pressure in the range from at least about 100 psig to about 3000 psig.

9. The process of claim 8, wherein conditions in the first reaction zone for catalyst preparation comprise a temperature in the range from at least about 100° F. to about 180° F., and a pressure in the range from at least about 200 psig to about 1000 psig.

10. The process of claim 9, wherein conditions in the first reaction zone for catalyst preparation comprise a temperature in the range from at least about 130° F. to about 160° F. and a pressure in the range from at least about 300 psig to about 500 psig.

11. The process of claim 1, wherein the hydrocarbon oil viscosity in step (d) ranges from at least about 2 cSt @ 212° F. to about 15 cSt @ 212° F.

12. The process of claim 1, wherein the Group VIII metal compound of step (c) is selected from the group consisting of nickel sulfates and cobalt sulfates.

13. The process of claim 1, wherein mixing of components in the catalyst preparation steps occurs in high shear mode, in the range from 100 RPM to 1600 RPM.

14. The process of claim 12, in which the weight ratio of nickel or cobalt to molybdenum ranges from 1:100 to about 1:2.

15. The process of claim 1, wherein the ratio of Group VIB metal oxide to oil in step (d) is at least less than 1.0, preferably less than 0.5, and more preferably less than 0.1.

16. The process of claim 1, wherein the hydrocarbon oil of step (d) is a vacuum gas oil.

17. The process of claim 1, wherein the conditions of the second reaction zone of step (e) comprise a temperature in the range from at least about 350° F. to about 600° F. and a pressure in the range from at least about 100 psig to about 3000 psig.

18. The process of claim 17, wherein the conditions of the second reaction zone comprise a temperature in the range from at least about 350° F. to about 600° F. and the pressure in the range from at least about 200 psig to about 1000 psig.

19. The process of claim 18, wherein hydrogen is continuously added to the second reaction zone, and high shear mixing is employed in order to maintain a homogenous slurry.

20. The process of claim 1, step (f) wherein the catalyst composition is recovered by means of a high pressure separator.

21. The process of claim 1, wherein the catalyst composition is stored in a storage tank, following recovery in step (f) in an active and concentrated state.

22. The process of claim 21, wherein the catalyst composition is continuously mixed in the storage tank to maintain a homogenous slurry.

23. The process of claim 1, wherein the hydroconversion process is hydrocracking, and hydroconversion conditions are hydrocracking conditions.

24. The process of claim 23, wherein hydrocracking conditions comprise a reaction temperature between about 250° C. and about 500° C. (482° F.–932° F.), pressure from about 3.5 MPa to about 24.2 MPa (500–3500 psi), a feed rate (vol oil/vol cat h) from about 0.1 to about 20 $hr^1$, and hydrogen circulation rates in the range from about 350 std liters H2/kg oil to 1780 std liters H2/kg oil (2,310–11,750 standard cubic feet per barrel).

25. The process of claim 1, wherein in step (h), the concentration of the catalyst composition in the heavy oil is normally from about 100 to 20,000 ppm as expressed by weight of metal in the catalyst to weight of feedstock.

* * * * *